United States Patent

Naiki et al.

[11] Patent Number: 5,943,153
[45] Date of Patent: Aug. 24, 1999

[54] LENS HOLDING APPARATUS AND A LIGHT-BEAM SCANNING OPTICAL APPARATUS

[75] Inventors: Toshio Naiki; Akiyoshi Hamada; Yoshihiro Inagaki, all of Toyokawa, Japan

[73] Assignee: Minolta Co., Ltd., Osaka, Japan

[21] Appl. No.: 08/947,745

[22] Filed: Oct. 9, 1997

Related U.S. Application Data

[63] Continuation-in-part of application No. 08/633,377, Apr. 17, 1996, Pat. No. 5,815,301.

[30] Foreign Application Priority Data

| Apr. 21, 1995 | [JP] | Japan | 7-096627 |
| Apr. 21, 1995 | [JP] | Japan | 7-097095 |
| Jan. 31, 1997 | [JP] | Japan | 9-018428 |

[51] Int. Cl.⁶ ............................................. G02B 26/08
[52] U.S. Cl. ....................... 359/210; 359/216; 359/821; 359/822; 359/823
[58] Field of Search .................... 359/196–226, 359/821–824, 710, 717

[56] References Cited

U.S. PATENT DOCUMENTS

| 5,148,190 | 9/1992 | Iizuka . |
| 5,774,248 | 6/1998 | Komatsu .................. 359/209 |

FOREIGN PATENT DOCUMENTS

| 59-034512 | 2/1984 | Japan . |
| 6-11657 | 1/1994 | Japan . |

Primary Examiner—James Phan
Attorney, Agent, or Firm—Burns, Doane, Swecker & Mathis, LLP

[57] ABSTRACT

A scanning optical apparatus has a convex cylindrical lens and a concave cylindrical lens between a light source for emitting a light beam and a polygon mirror. The cylindrical lenses condense the light beam in the vicinity of a deflecting surface of the polygon mirror only in the sub-scanning direction. The cylindrical lenses are held by a lens barrel to form one unit, and the lens barrel is mounted on a V groove formed in a base. The position of the unit having the cylindrical lenses is adjustable along the optical axis, and the rotational angle of the unit is adjustable about the optical axis.

15 Claims, 6 Drawing Sheets

5,943,153

LENS HOLDING APPARATUS AND A LIGHT-BEAM SCANNING OPTICAL APPARATUS

This application is a continuation-in-part of U.S. patent application Ser. No. 08/633,377, entitled "Scanning Optical Apparatus", filed on Apr. 17, 1996, U.S. Pat. No. 5,815,301, the disclosure of which is expressly incorporated herein by reference.

BACKGROUND OF THE INVENTION

1. Field of the Invention

The present invention relates to a lens holding apparatus and a light-beam scanning optical apparatus, and more particularly to a lens holding apparatus and a light-beam scanning optical apparatus for use as an image writing means in a laser printer or digital photocopier.

2. Description of the Prior Art

Various types of light-beam scanning optical apparatus are known that are used as means for writing images onto a photoreceptor in electronic photography apparatus. Typically, in such scanning optical apparatus, a light beam emitted from a light source unit is deflected by a polygon mirror, and is then focused, through optical members such as a scanning lens, on a photoreceptor to scan the surface thereof. In conventional light-beam scanning optical apparatus, to compensate for the tilt error of each deflecting surface of the polygon mirror, a condenser lens (usually a cylindrical lens) is provided between the light source unit and the deflector (polygon mirror) so that the light beam will be focused, only in the sub-scanning direction, in the vicinity of the deflecting surface, and another lens member is provided between the deflector and the photoreceptor so that the light beam will be focused, in the sub-scanning direction, on the photoreceptor. In addition, to alleviate degradation of produced images (resulting from uneven pitches in the sub-scanning direction) due to the tilt error of the deflecting surface, it is customary to set the absolute value of the magnification of the scanning lens in the sub-scanning direction to 2x or less.

However, setting the magnification in the sub-scanning direction to so small a value reduces the beam-waist diameter obtained on the photoreceptor that serves as the image plane of the scanning optical system, and, inconveniently, this makes the depth of focus unduly short. As a result, even a slight amount of defocus arising in the scanning optical system due to a change in ambient conditions causes the beam-waist diameter to vary considerably, and thus, in conventional scanning optical apparatus, the quality of produced images tends to vary with ambient conditions.

Accordingly, in conventional light-beam scanning optical apparatus, the shape of the light beam on the photoreceptor is corrected into a desired shape either by using a flat aperture, sacrificing efficient use of light, or by using a long-focal-length cylindrical lens, sacrificing compactness of the apparatus.

In order to overcome the above-noted problems, in Japanese Laid-open Patent No. H9-97065, a light-beam scanning optical apparatus is proposed which provides a sufficiently small beam-waist diameter on the photoreceptor despite having a relatively short optical path and that automatically corrects the beam-waist diameter in accordance with the ambient temperature. In this light-beam scanning optical apparatus, the use of a cylindrical lens composed of two lenses, i.e. a first lens that is a convex lens and a second lens that is a concave lens, helps to bring the principal point of the cylindrical lens that corresponds to the image formed on the deflecting surface of the polygon mirror closer to the light source, and thus to make the composite focal length of the first and second lenses shorter.

However, the light-beam scanning optical apparatus proposed by the above-mentioned Japanese Laid-open Patent No. H9-97065 requires the beam-waist diameter on the photoreceptor to be adjusted through the adjustment of each of the lenses constituting the cylindrical lens in terms of the direction of the optical axis and the rotational angle about the optical axis, and thus requires a complicated adjustment mechanism as well as a complicated adjustment method.

SUMMARY OF THE INVENTION

An object of the present invention is to provide a lens holding apparatus and a light-beam scanning optical apparatus that uses a cylindrical lens composed of two lenses to compensate for the tilt error of the deflecting surface and that nevertheless allows the beam-waist diameter on the photoreceptor to be adjusted with a simple adjustment mechanism and by a simple adjustment method.

To achieve the above object, according to one aspect of the present invention, a lens holding apparatus for use in a scanning optical apparatus is provided with a lens holder that holds a plurality of cylindrical lenses so that they can be handled as one unit; and an adjustment mechanism that allows the lens holder to be rotated for adjustment about an axis perpendicular to each of the cylindrical lenses.

According to another aspect of the present invention, a scanning optical apparatus is provided with a light source apparatus that emits a parallel or converging light beam; a deflector that deflects the light beam emitted from the light source apparatus; a plurality of cylindrical lenses that are arranged between the light source apparatus and the deflector in such a way that the light beam emitted from the light source apparatus is condensed in a sub-scanning direction in the vicinity of a deflecting surface of the deflector; a lens holder that holds the cylindrical lenses so that they can be handled as one unit; an adjustment mechanism that allows the lens holder to be rotated for adjustment about an axis perpendicular to each of the cylindrical lenses; and a scanning lens system that condenses the light beam deflected by the deflector on a surface to be scanned.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Hereinafter, embodiments of the present invention will be described with reference to the drawings.

Figure 1:
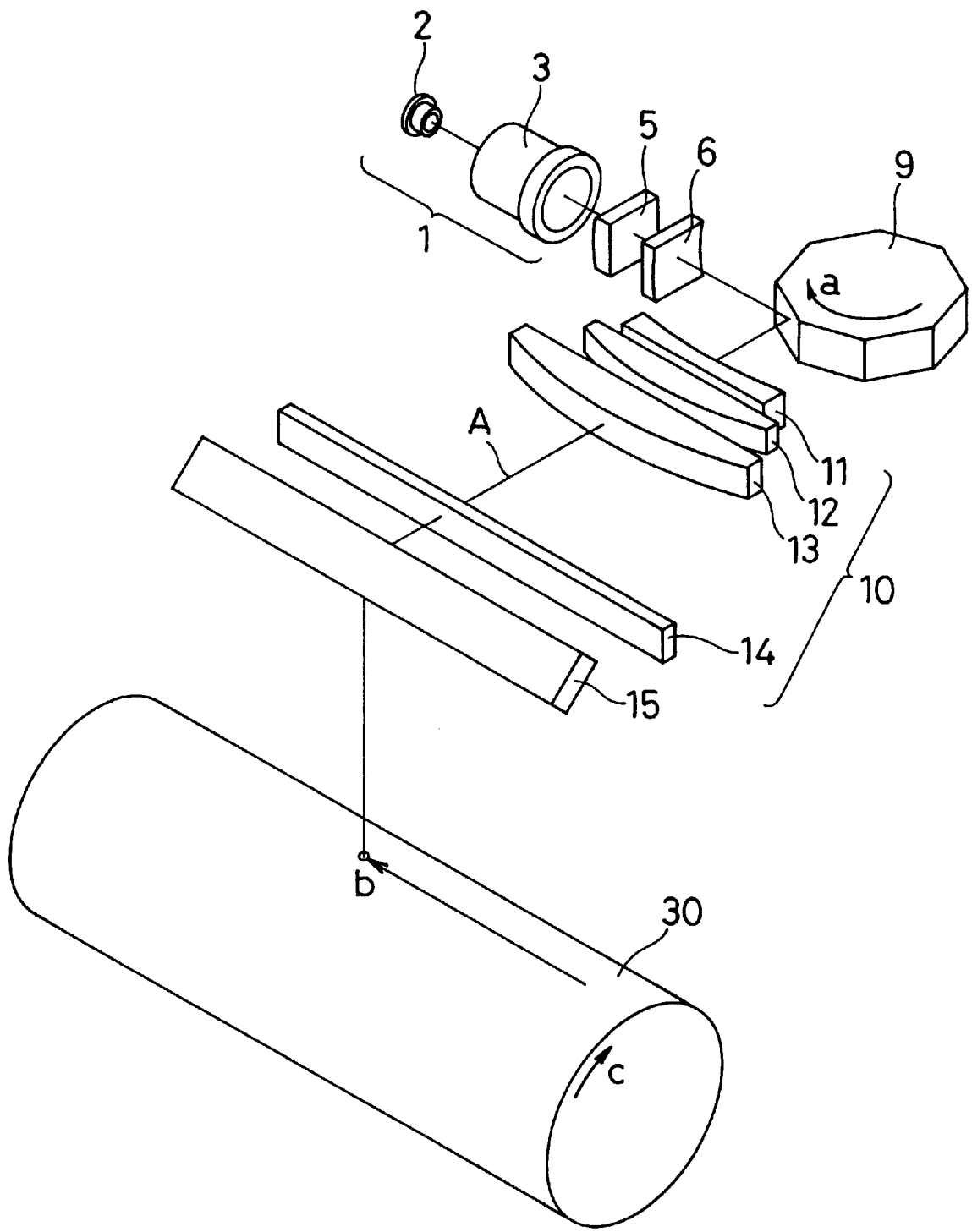
FIG. 1 is a perspective view of a light-beam scanning optical apparatus embodying the invention.
Figure 2A:
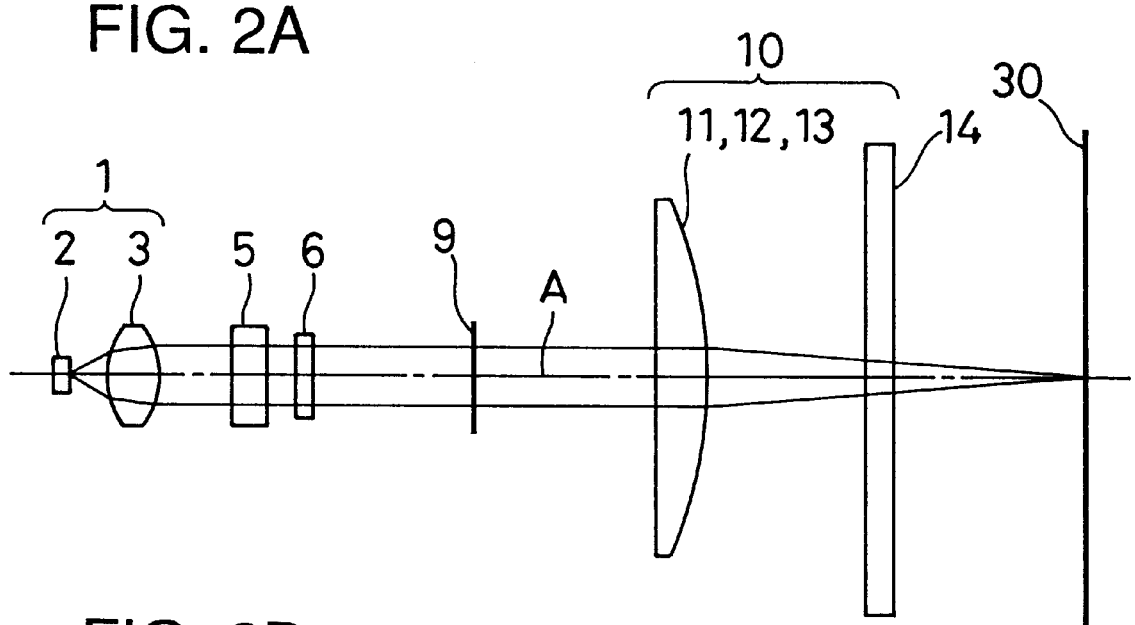
FIGS. 2A and 2B are optical-path diagrams of the light-beam scanning optical apparatus, with FIG. 2A illustrating the optical paths on a cross section in the main scanning direction and FIG. 2B illustrating the optical paths on a cross section in the sub-scanning direction.
Figure 2B:
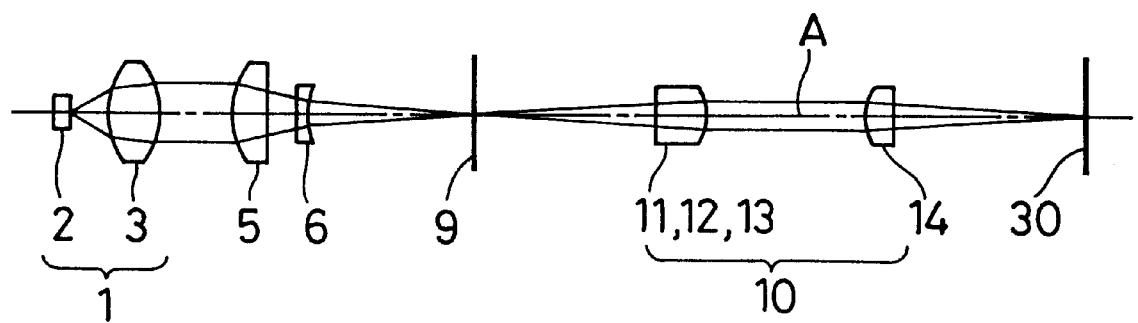

FIG. 1 shows a light-beam scanning optical apparatus embodying the invention. This light-beam scanning optical apparatus includes a light source unit 1 composed of a laser diode 2 and a collimator lens 3, concave and convex cylindrical lenses 5 and 6, a polygon mirror 9, a scanning lens 10 composed of three fθ lenses 11, 12, and 13 and a cylindrical lens 14, and a flat mirror 15. FIGS. 2A and 2B show the optical paths of the light-beam scanning optical apparatus.

The laser diode 2, by being supplied with a signal modulated by an image signal, emits a diverging light beam. This diverging light beam is made into a parallel (or converging) light beam by the collimator lens 3, and then, through the cylindrical lenses 5 and 6, reaches the polygon mirror 9. Meanwhile, the cylindrical lenses 5 and 6 condense the light beam into a line extending in the main scanning direction in the vicinity of a deflecting surface of the polygon mirror 9.

The polygon mirror 9 is rotated in the direction indicated by arrow a at a uniform speed. As the polygon mirror 9 rotates, the light beam is deflected at a uniform angular velocity by the deflecting surface. Thereafter, the light beam passes through the scanning lens 10, is reflected by the flat mirror 15, and is condensed on the photoreceptor drum 30 to scan the surface thereof in the direction indicated by arrow b. The fθ lenses 11, 12, and 13, by making uniform the speed with which the light beam deflected at a uniform angular velocity by the polygon mirror 9 scans the light-receiving surface (of the photoreceptor drum 30) in the main scanning direction, serve to correct distortion. The cylindrical lens 14 has a power only in the sub-scanning direction, and serves, in combination with the cylindrical lenses 5 and 6, to compensate for the tilt error of the deflecting surfaces of the polygon mirror 9.

The photoreceptor drum 30 is rotated in the direction indicated by arrow c at a uniform speed. Eventually, as a result of the interaction between the main scanning in the direction indicated by arrow b achieved by means of the polygon mirror 9 and the scanning lens 10 and the sub-scanning in the direction indicated by arrow c achieved by means of the photoreceptor drum 30, an image (an electrostatic latent image) is written onto the photoreceptor drum 30.

Next, the cylindrical lenses 5 and 6 will be described.

The cylindrical lens 5 is a convex lens having a positive refractive power only in the sub-scanning direction, and is arranged with its convex surface facing toward the light source unit 1. The cylindrical lens 6 is a concave lens having a negative refractive power only in the sub-scanning direction, and is arranged with its flat surface facing toward the light source unit 1. On the other hand, the cylindrical lens 14 is a convex lens having a positive refractive power only in the sub-scanning direction, and is arranged with its convex surface facing toward the light source unit 1.

In the embodiment under discussion, condensing of the parallel light beam emitted from the light source unit 1 in the sub-scanning direction in the vicinity of a deflecting surface of the polygon mirror 9 is achieved by the refractive power distributed between one convex cylindrical lens 5 and one concave cylindrical lens 6. This helps to bring the principal point of the cylindrical lenses 5 and 6 as a whole that corresponds to the image formed on the deflecting surface closer to the light source unit 1, and thus to make the composite focal length of the cylindrical lenses 5 and 6 shorter.

Figure 3:
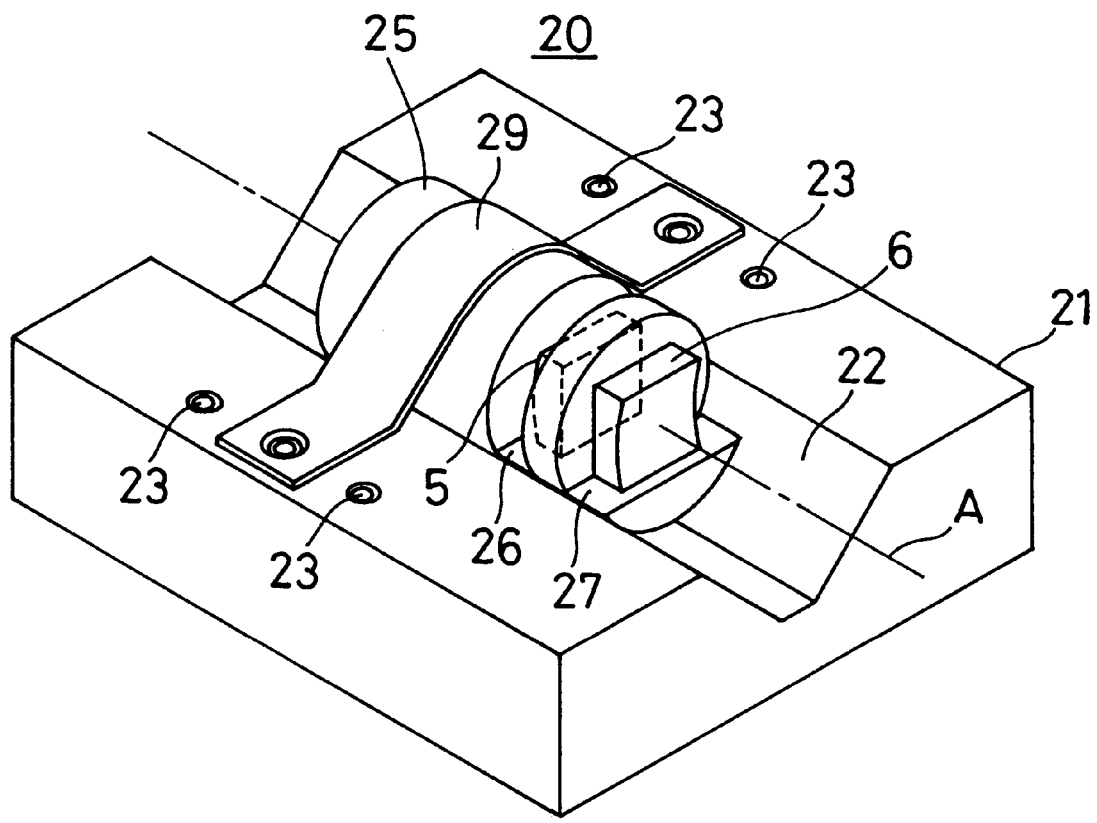
FIG. 3 is a perspective view of a lens holding apparatus embodying the invention.
Figure 4A:
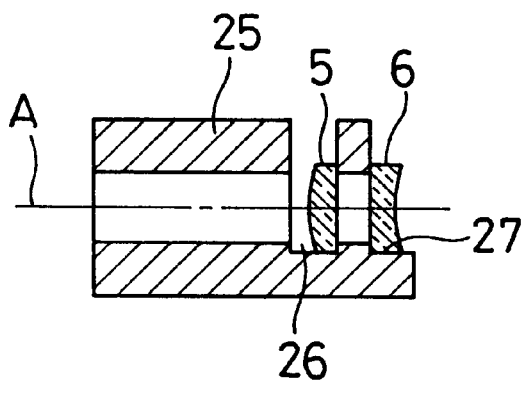
FIGS. 4A and 4B are cross-sectional views of the lens barrel of the scanning optical apparatus, with FIG. 4A illustrating a lens barrel of the same type as shown in FIG. 3 and FIG. 4B illustrating a lens barrel of another type.

These cylindrical lenses 5 and 6 are held by a holder 20 shown in FIG. 3 and FIG. 4A. The holder 20 is composed of a base 21, a lens barrel 25, and a fitting plate 29. The lens barrel 25 has the shape of a hollow cylinder having a circular cross section, and has two lens clearances 26 and 27 where the lenses 5 and 6, respectively, are fixed to the lens barrel 25 with adhesive or plate springs. The lens barrel 25 is mounted on the V groove 22 of the base 21, and is fixed thereto by being pressed thereon by the fitting plate 29 that is at both ends fastened to the base 21 with screws. The base 21 is fastened to the base portion of the housing (not shown) of the apparatus with screws that are placed through fitting holes 23.

Figure 4B:
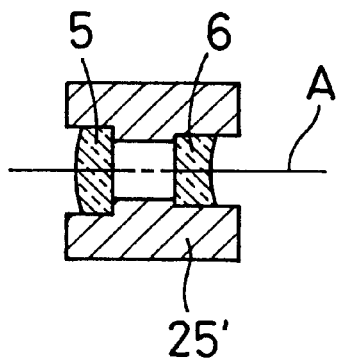

As shown in FIG. 3, the holder 20 is designed to keep the cylindrical lenses 5 and 6 in position in the lens barrel 25 mounted on the base 21 in such a way that, when the base 21 is fitted to the base portion of the housing, the centers of the lenses 5 and 6 are on the optical axis A. Accordingly, the positions of the lenses 5 and 6 along the optical axis A are adjusted by moving the lens barrel 25 along the V groove 22 and fixing it at an appropriate position with the fitting plate 29. Moreover, the position of the base 21 itself can be fine-adjusted along the optical axis A by moving it within the clearance provided between its fitting holes 23 and the screws (not shown) placed therethrough. In these ways, by moving the lenses 5 and 6 along the optical axis A, it is possible to adjust the focus (how the beam is condensed) on the photoreceptor drum 30 in the sub-scanning direction. On the other hand, the beam-waist diameter on the photoreceptor drum 30 is adjusted by rotating the lens barrel 25 little by little on the V groove 22 with the fitting plate 29 somewhat loosened. This causes the lenses 5 and 6 to rotate together as one unit about the optical axis A. FIG. 4B shows another example of the construction of the lens barrel 25'.

Next, a description will be given, with reference to FIGS. 5A, 5B, 6A, and 6B, as to the change of the beam-waist diameter as observed when the lenses 5 and 6 are rotated together as one unit about the optical axis A. The graphs in these figures presuppose the use of either of the two examples of the optical system whose construction data is shown in Tables 1 and 2, respectively, below.

TABLE 1

| Construction of the Optical System, First Example | |
|---|---|
| Focal Length of the Convex Cylindrical Lens | 30 mm |
| Focal Length of the Concave Cylindrical Lens | −30 mm |
| Distance between the Two Cylindrical Lenses (Equivalent Value) | 7.4 mm |
| Magnification of the Scanning Lens in the Sub-scanning Direction (Absolute Value) | 1.5 |
| Value of the Conditional Expression | 0.19 |

TABLE 2

Construction of the Optical System, Second Example

| | |
|---|---|
| Focal Length of the Convex Cylindrical Lens | 30 mm |
| Focal Length of the Concave Cylindrical Lens | −20 mm |
| Distance between the Two Cylindrical Lenses (Equivalent Value) | 12.3 mm |
| Magnification of the Scanning Lens in the Sub-scanning Direction (Absolute Value) | 0.74 |
| Value of the Conditional Expression | 0.36 |

In Tables 1 and 2, the "conditional expression" refers to the formula below that defines the positional relationship between the cylindrical lenses 5 and 6 held in the lens barrel 25.

$$0.1 < \{L(L-f_1)/f_1 f_2\} < 1$$

where $f_1$ represents the focal length of the convex cylindrical lens 5, $f_2$ represents the focal length of the concave cylindrical lens 6, and L represents the distance from the rear principal point of the convex cylindrical lens 5 to the front principal point of the concave cylindrical lens 6.

Figure 5A:
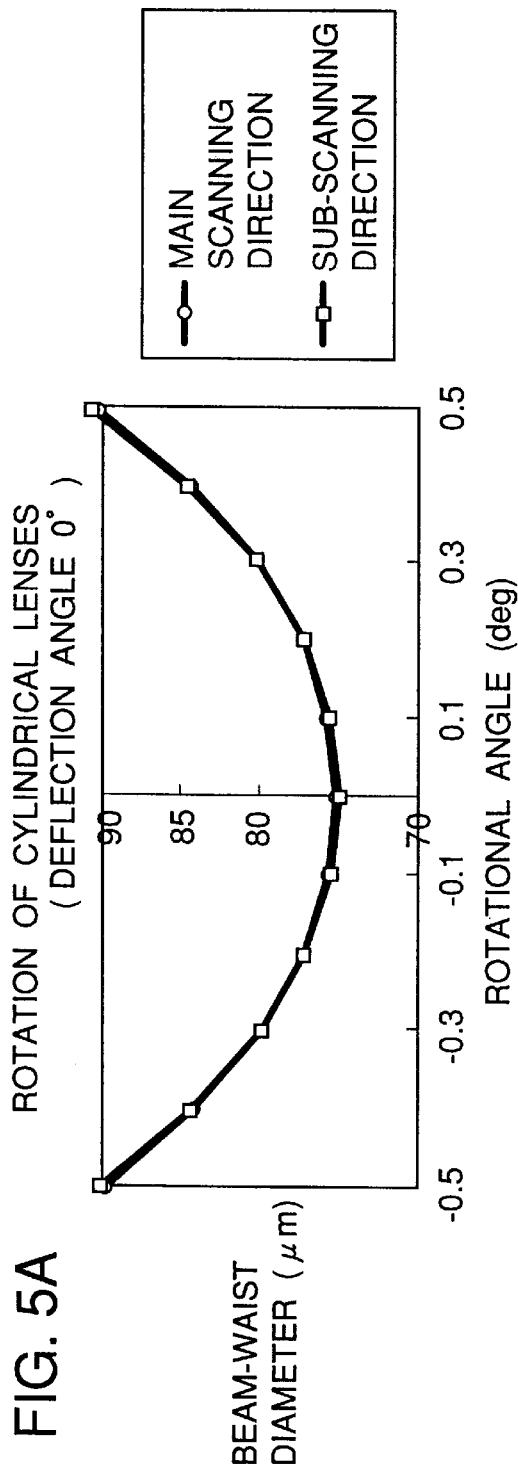
FIGS. 5A and 5B are graphs showing the variation of the beam-waist diameter (as designed) in the light-beam scanning optical apparatus.
Figure 5B:
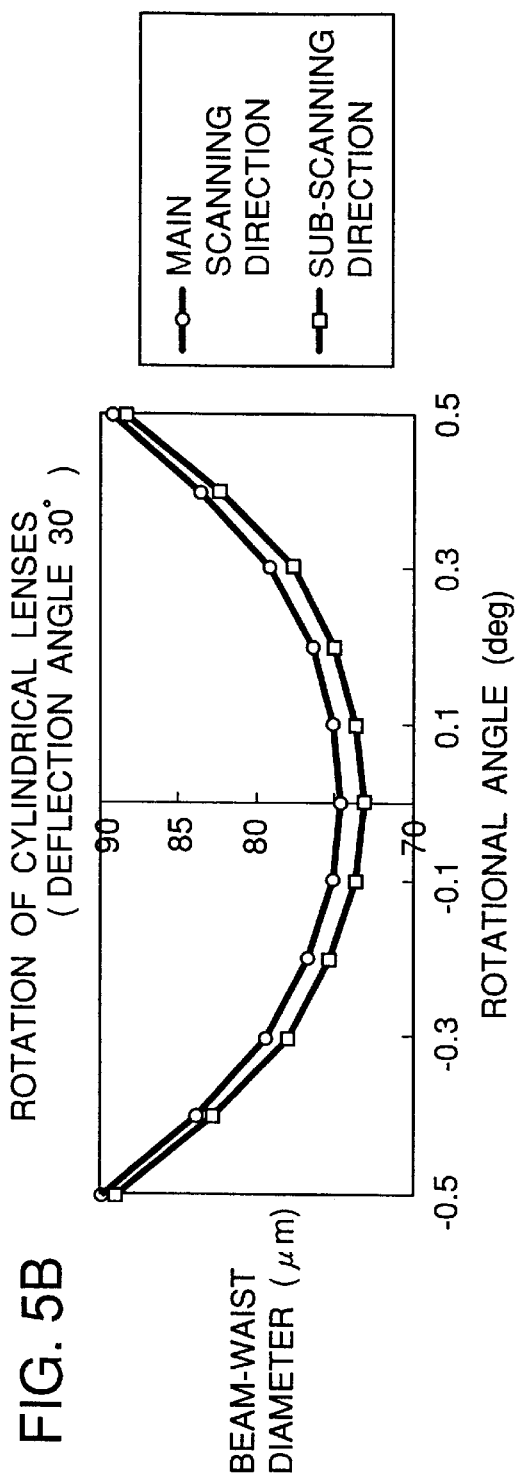
Figure 6A:
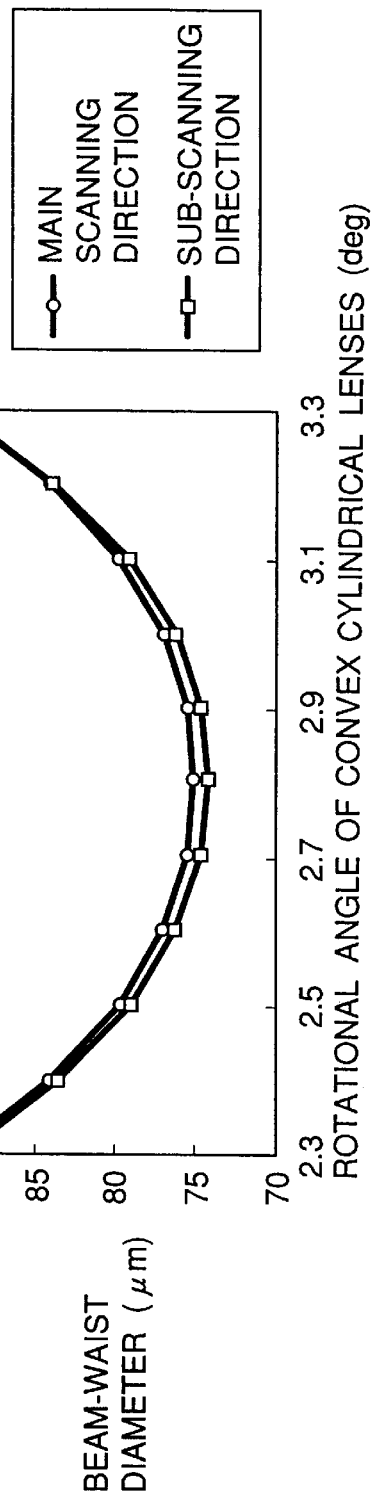
FIGS. 6A and 6B are graphs showing the variation of the beam-waist diameter (as observed when the concave lens has a rotational error of 1° relative to the convex lens) in the light-beam scanning optical apparatus.
Figure 6B:
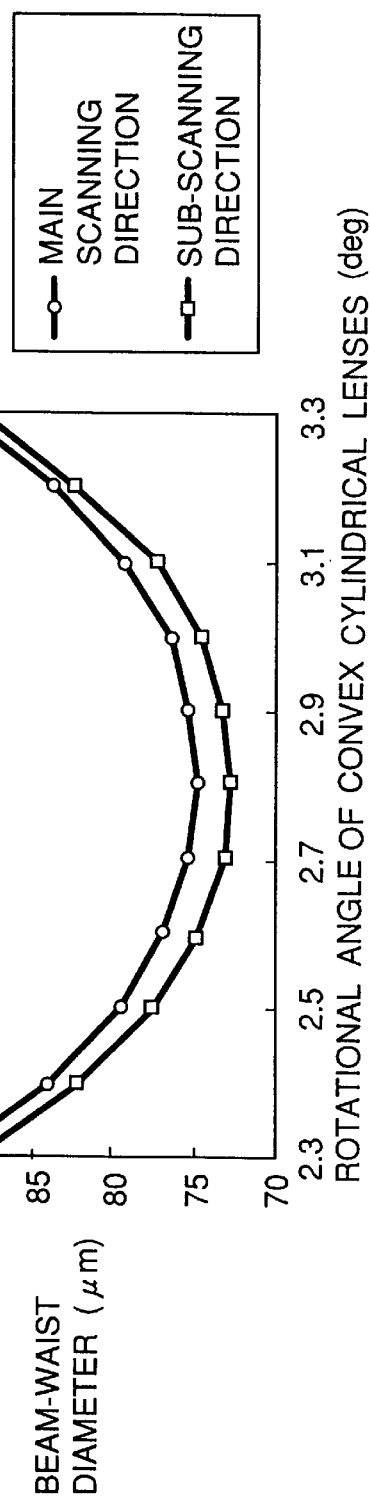

FIGS. 5A and 5B show the change of the beam-waist diameter as observed when the cylindrical lenses 5 and 6 are rotated together as one unit about the optical axis A by rotating the holder 20, with FIG. 5A showing the change observed at a deflection angle of 0° and FIG. 5B showing the change observed at a deflecting angle of 30°. As seen from FIGS. 5A and 5B, in this case, the beam-waist diameter exhibits a relatively gentle change pattern, and therefore can be fine-adjusted easily. FIGS. 6A and 6B show the change of the beam-waist diameter as observed when the cylindrical lenses 5 and 6 are rotated together as one unit about the optical axis A by rotating the holder 20 under the condition that the concave lens 6 is held by the lens barrel 25 with a rotational error of 1° relative to the convex lens 5. As seen from FIGS. 6A and 6B, in this case, the beam-waist diameter exhibits almost the same change pattern as in the case shown in FIGS. 5A and 5B, except that the central value of the rotational angle, at which the beam-waist diameter is smallest, is shifted from 0° to 2.8°.

Figure 7A:
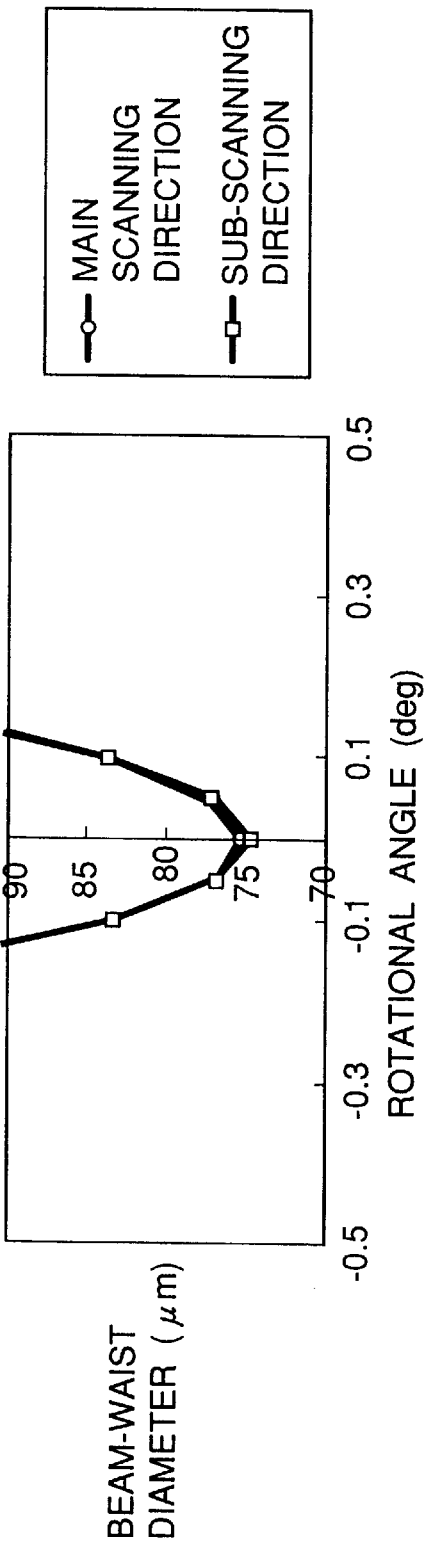
FIGS. 7A and 7B are graphs showing the variation of the beam-waist diameter (as observed when only the convex lens is rotated while the concave lens is kept fixed, as an example for comparison) in the light-beam scanning optical apparatus.
Figure 7B:
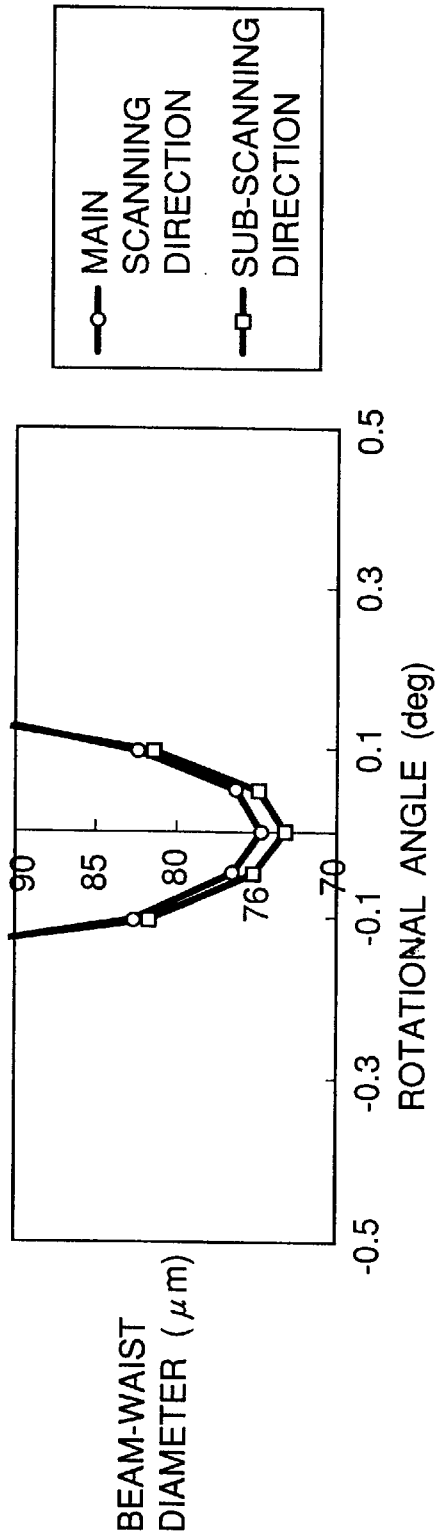

For comparison, FIGS. 7A and 7B show the change of the beam-waist diameter observed when only the convex cylindrical lens 5 is rotated (while keeping the concave cylindrical lens 6 fixed). In this case, even a slight rotation of the convex cylindrical lens 5 causes a large change in the beam-waist diameter. From FIGS. 5A, 5B, 6A, 6B, 7A, and 7B, it would be clear that the beam-waist diameter can be adjusted more easily when the two lenses 5 and 6 are rotated together as one unit.

In this way, by designing the optical system in such a way that the positions of the two cylindrical lenses can be adjusted by moving them together as one unit, it is possible to reduce by half, as compared with a construction in which the two lenses are held separately, the number of components required for the adjustment of the rotational angles and the directions of the optical axes of the cylindrical lenses. This helps simplify the construction of the scanning optical apparatus and reduce the number of high-precision components used therein, contributing to the reduction of the cost of the apparatus. In addition, even when the position of the entire unit including the two cylindrical lenses changes as a result of a change in ambient conditions or other, such an error affects the beam-waist diameter on the image plane less than an error in the relative positions of the two cylindrical lenses with respect to each other. Accordingly, it is possible to realize an optical system that offers a satisfactorily uniform beam-waist diameter even under changing ambient conditions.

Moreover, in the embodiment under discussion, the tilt error of the deflecting surfaces of the polygon mirror 9 is compensated for by the cylindrical lenses 5, 6, and 14. For the tilt error to be properly compensated for, it is preferable that the absolute value of the magnification of the scanning lens in the sub-scanning direction be 2x or less. For example, in the optical systems shown in Tables 1 and 2 as the first and second examples, the magnification (absolute value) of the scanning lens in the sub-scanning direction is 1.5x and 0.74x, respectively.

Furthermore, the fact that the conditional expression introduced previously has "1" as its maximum value implies that, when two cylindrical lenses 5 and 6 are used in combination, their composite focal length can be made shorter than the focal length of a single cylindrical lens used in a conventional optical system. This makes it possible to shorten the optical path before the polygon mirror 9, and thus to obtain a compact optical system. The conditional expression has "0.1" as its minimum value simply because a smaller value causes aberration that is too difficult to correct properly.

Moreover, in the embodiment under discussion, it is preferable that the cylindrical lenses 6 and 14 be made of resin so that the beam-waist diameter on the photoreceptor drum 30 will not change even when the ambient temperature varies, that is, so that a change in the ambient temperature will be compensated for. The lenses other than these are made of glass. The refractive index and the shape of a lens made of resin vary more than those of a lens made of glass as the ambient temperature varies. This property, however, can be used in a positive way if the variation in the positive refractive power of the cylindrical lens 14 is canceled by the variation in the negative refractive power of the cylindrical lens 6 in the sub-scanning direction, and thereby the movement of the focal point of one lens due to the variation of the ambient temperature is canceled by the movement of the focal point of the other due to the variation of the ambient temperature. This makes it possible to keep an adequate beam-waist diameter on the photoreceptor drum 30 all the time.

It should be understood that the lens holding apparatus and the light-beam scanning optical apparatus of the invention are not limited to the embodiment described above, but allow various modifications that are made within the scope of the invention.

In particular, correction of the tilt error may be achieved, instead of providing the cylindrical lens 14 after the polygon mirror 9, by forming one surface within the fθ lenses 11, 12, and 13 into a toroidal, aspherical, or similarly-functioning shape.

Moreover, the lens barrel 25 may or may not be fastened to the base 21, and the base 21 may or may not be fastened to the base portion of the housing.

What is claimed is:

1. A lens holding apparatus for use in a scanning optical apparatus, comprising:

a lens holder that holds a plurality of cylindrical lenses so that they can be handled as one unit; and an adjustment mechanism that allows the lens holder to be rotated for adjustment about an axis perpendicular to each of the cylindrical lenses.

2. A lens holding apparatus as claimed in claim 1, wherein the cylindrical lenses consist of a first lens having a positive power and a second lens having a negative power.

3. A lens holding apparatus as claimed in claim 1, wherein the cylindrical lenses include a plano-convex lens and a plano-concave lens.

4. A lens holding apparatus as claimed in claim 1, wherein the cylindrical lenses include a plano-convex lens and a plano-concave lens arranged with their flat surfaces facing each other.

5. A lens holding apparatus as claimed in claim 1, wherein said lens holder has a cylindrical surface, and wherein said adjustment mechanism includes a base with a V groove into which said lens holder is positioned and a fitting plate for securing said lens holder in said V groove of said base.

6. A lens holding apparatus as claimed in claim 1, wherein the adjustment mechanism allows the lens holder to be moved in the direction of said axis, said axis being perpendicular to each of the cylindrical lenses.

7. A lens holding apparatus, comprising:
 a lens holder that holds a plurality of cylindrical lenses so that they can be handled as one unit wherein the following condition is satisfied:

$$0.1 < L(L-f_1)/f_1 f_2 < 1$$

where $f_1$ represents a focal length of a first cylindrical lens, $f_2$ represents a focal length of a second cylindrical lens, and L represents a distance from a rear principal point of the first cylindrical lens to a front principal point of the second cylindrical lens; and
 an adjustment mechanism that allows the lens holder to be rotated for adjustment about an axis perpendicular to each of the cylindrical lenses.

8. A scanning optical apparatus comprising:
 a light source apparatus for emitting a parallel or converging light beam;
 a deflector for deflecting the light beam emitted from the light source apparatus;
 a plurality of cylindrical lenses arranged between the light source apparatus and the deflector for condensing the light beam emitted from the light source apparatus in a sub-scanning direction in vicinity of a deflecting surface of the deflector;
 a lens holder for holding the cylindrical lenses so that they can be handled as one unit;
 an adjustment mechanism for allowing the lens holder to be rotated for adjustment about an axis perpendicular to each of the cylindrical lenses; and
 a scanning lens system for condensing the light beam deflected by the deflector on a surface to be scanned.

9. A scanning optical apparatus as claimed in claim 8, wherein the cylindrical lenses consist of a first lens having a positive power and a second lens having a negative power.

10. A scanning optical apparatus as claimed in claim 8, wherein the cylindrical lenses include a plano-convex lens and a plano-concave lens.

11. A scanning optical apparatus as claimed in claim 8, wherein the cylindrical lenses include a plano-convex lens and a plano-concave lens arranged with their flat surfaces facing each other.

12. A lens holding apparatus as claimed in claim 8, wherein said lens holder has a cylindrical surface, and wherein said adjustment mechanism includes a base with a V groove into which said lens holder is positioned and a fitting plate for securing said lens holder in said V groove of said base.

13. A scanning optical apparatus as claimed in claim 8, wherein the adjustment mechanism allows the lens holder to be moved in the direction of said axis, said axis being perpendicular to each of the cylindrical lenses.

14. A scanning optical apparatus comprising:
 a light source apparatus for emitting a parallel or converging light beam;
 a deflector for deflecting the light beam emitted from the light source apparatus;
 a plurality of cylindrical lenses arranged between the light source apparatus and the deflector for condensing the light beam emitted from the light source apparatus in a sub-scanning direction in vicinity of a deflecting surface of the deflector;
 a lens holder for holding the cylindrical lenses so that they can be handled as one unit;
 an adjustment mechanism for allowing the lens holder to be rotated for adjustment about an axis perpendicular to each of the cylindrical lenses; and
 a scanning lens system for condensing the light beam deflected by the deflector on a surface to be scanned wherein an absolute value of a magnification of the scanning lens system in the sub-scanning direction is 2x or less.

15. A scanning optical apparatus comprising:
 a light source apparatus for emitting a parallel or converging light beam;
 a deflector for deflecting the light beam emitted from the light source apparatus;
 a plurality of cylindrical lenses arranged between the light source apparatus and the deflector for condensing the light beam emitted from the light source apparatus in a sub-scanning direction in vicinity of a deflecting surface of the deflector;
 a lens holder for holding the cylindrical lenses so that they can be handled as one unit wherein the cylindrical lenses consist of a first lens having a positive power and a second lens having a negative power, and wherein the following condition is satisfied:

$$0.1 < L(L-f_1)/f_1 f_2 < 1$$

where $f_1$ represents a focal length of the first lens, $f_2$ represents a focal length of the second lens, and L represents a distance from a rear principal point of the first lens to a front principal point of the second lens;
 an adjustment mechanism for allowing the lens holder to be rotated for adjustment about an axis perpendicular to each of the cylindrical lenses; and
 a scanning lens system for condensing the light beam deflected by the deflector on a surface to be scanned.

* * * * *